May 21, 1963  YOSHIKAZU ITO  3,090,739
METHOD OF PRODUCING NITROSO COMPOUNDS OR OXIMES
Filed July 18, 1960
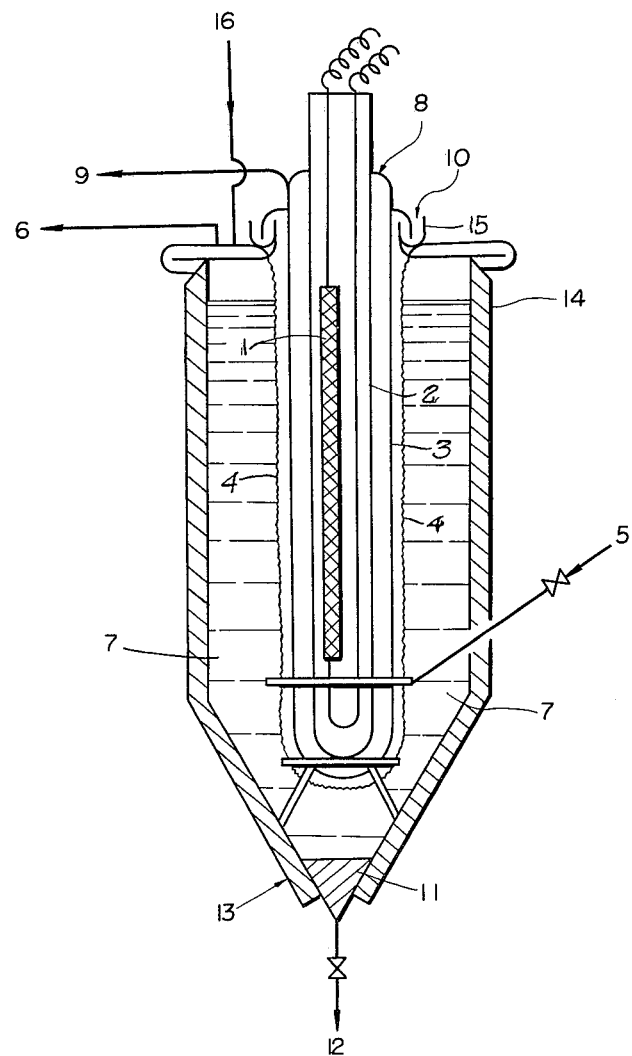
INVENTOR
Yoshikazu Ito
BY
ATTORNEY : United States Patent Office 3,090,739
Patented May 21, 1963

3,090,739
METHOD OF PRODUCING NITROSO COMPOUNDS OR OXIMES
Yoshikazu Ito, Nagoya-shi, Aichi-ken, Japan, assignor to Toyo Rayon Kabushiki Kaisha, Tokyo, Japan, a corporation of Japan
Filed July 18, 1960, Ser. No. 43,440
Claims priority, application Japan July 20, 1959
5 Claims. (Cl. 204—162)

This invention relates to a method of producing a nitroso compound or an oxime. More particularly, it relates to a method of producing the foregoing compound photochemically.

An object of this invention is to provide an industrial method of producing efficiently a nitroso compound and an oxime from an alkane or a cycloalkane by removing the reaction products or by-products, that deposit during the time that the reaction proceeds, on the surface of the tube or the reaction vessel through which the light passes and with which the reaction liquid makes contact.

Another object of the invention is to provide an industrial method whereby it is possible to effect Beckmann's rearrangement of a cycloalkanone oxime by heating the sulfuric acid containing said oxime of which sulfuric acid solution has been separated from the reaction liquid.

A still another object of the invention is to provide a method of producing with a high yield cyclohexanone oxime and ε-caprolactam, which are the starting materials used in the production of 6-nylon.

Other objects and advantages of the invention will become apparent from the following detailed description.

That by reacting a nitrosation agent with an alkane or a cyclohexanone having 5 to 10 carbon atoms under irradiation by an actinic light it is possible to produce the corresponding nitroso compound or oxime is known. As modes of practicing this photochemical reaction there are known various methods such as, for example, a method of blowing into the reaction tank a nitrosation agent in a gaseous state while either immersing a light source in the reaction liquid or by causing the light to radiate while being placed external to the reaction tank, a method of letting the reaction liquid containing a nitrosation agent to flow down along a wall through which the rays from a light source pass, a method of letting the reaction liquid flow down along this wall with which it makes contact in a counterdirection with respect to a nitrosation agent which has been supplied thereon in a gaseous state, etc. As the actinic light, any of those capable of emitting rays having a wave length of less than 6000 A., i.e., 600 m$\mu$, may be used. If examples are cited, there are sunlight, tungsten lamp, fluorescent lamp, mercury lamp, etc.

When a photochemical reaction is carried out by these known reaction methods, there is a tendency that a nitroso compound or a halogenic acid salt of an oxime, the reaction product, and a halogenated nitroso compound, the reaction by-product, deposit on the outermost wall through which the rays pass which is the surface with which the reaction liquid makes contact. With the passage of time, the formed products adhere to the wall and impede the transmission of the rays, whereby not only is caused a gradual decrease in the yield of the nitroso compound or oxime by the reaction, but also the quality of the product deteriorates by its gradually turning to tar as a result of the absorption of the rays by the adhering product.

On account of the foregoing reasons, in the conventional methods, it was not possible to carry out the reaction continuously. After a short period of photochemical reaction, it was necessary to suspend the reaction and clean the wall surface with which the reaction liquid makes contact. As a result of much study in regard to this defect, I found that by letting a film of sulfuric acid flow down the outermost wall through which the light passes and which is the surface with which the reaction liquid makes contact, it was possible to carry out the reaction satisfactorily without the occurrence of any deposits on the wall surface of reaction products or by-products, as well as without this sulfuric acid affecting the reaction.

Precisely, by means of sulfuric acid the formed products which either have deposited on the wall surface or are about to do so are dissolved and removed. As a result, the wall surface with which the reaction liquid makes contact is at all times maintained photochemically in a clean state. Thus, the irradiated rays are fully absorbed in the reaction liquid, and the reaction may be carried out very stably over a long period of hours.

Further, since there are no reaction products which deposit on the surface with which the reaction liquid makes contact, the turning to tar of said deposit does not occur nor does deterioration of quality of the end product. Thus, an improvement in the quality of the nitroso compound and oxime produced is realized.

As the nitrosation agent of this invention, there are used for example, the following compounds, suitably mixed, such as nitrosyl halides, nitrosyl sulfuric acid, hydrogen halides, halogens, nitrogen oxide, nitrogen peroxide etc. In case chlorine is used as the halogen, if the relationship between the nitrosation agent and the product formed is shown, it would be as follows:

(a) Nitrosyl chloride and hydrogen chloride (NOCl and HCl)

In this case, a hydrochloride salt of an oxime is formed chiefly as the end product.

(b) Nitrogen oxide and chlorine gas and hydrogen chloride (NO, $Cl_2$ and HCl)

In this case, a hydrochloride salt of an oxime is formed chiefly as the end product, similarly as in case of (a), above.

(c) Nitrogen oxide and chlorine gas (NO and $Cl_2$)

In this case, a large amount of nitroso compounds and a small amount of oximes are formed.

(d) Nitrogen oxide and nitrogen peroxide and hydrogen chloride (NO, $NO_2$ and HCl)

In this case, a hydrochloride salt of an oxime is formed chiefly.

(e) Nitrogen oxide and oxygen and hydrogen chloride (NO, $O_2$ and HCl)

In this case, a hydrochloride salt of an oxime is formed chiefly.

(f) Nitrosylsulfuric acid and hydrogen chloride ($NOHSO_4$ and HCl)

In this case a hydrochloride salt of an oxime is formed chiefly.

Moreover, in accordance with this invention, it is possible to use a sulfuric acid of any concentration so long as it is over 4%. Hence, generally speaking, it may be a dilute, a concentrated or a fuming sulfuric acid.

If further details are set forth concerning the sulfuric acid, it is that for the purpose of removing the oximes or nitroso compounds that deposit on the surface of the tube or reaction vessel through which the light passes and with which the alkane or cyclohexane makes contact, it is possible to achieve said objective by using any sulfuric acid of a concentration of above 4%, as described hereinabove.

However, as described hereinafter, in this case if a concentrated sulfuric acid of above 90% concentration, in particular, preferably above 95%, or a fuming sulfuric acid is used, since it is possible directly to accomplish Beckmann's rearrangement of the sulfuric acid solution separated from the reaction product, it is advantageous.

While the quantity of the acid used need only be the minimum required to cause a film of the same to flow down the wall surface with which it makes contact, a use of a somewhat larger quantity does not harm the reaction.

The sulfuric acid may be allowed to flow down continuously during the reaction or may be fed in given quantities intermittently.

While, in accordance with this invention, the reaction method in which the light source is immersed in the central part of a reaction tank or that in which the light is radiated from a source external to the reaction tank may be employed in a similar manner, in the accompanying drawing the immersion method will be described.

The accompanying drawing illustrates a preferred embodiment for practicing this invention, a reaction apparatus of the conventional immersion type having been shown schematically in section. In the drawing, the rays from a light source 1 after passing through a protective tube 2, a layer of cooling water 3 and the outermost tube 4 enter the photochemical system while the nitrosation agent is blown in to below the light source in a gaseous state at 5. The gas which has passed through the reaction liquid 7 is then exhausted to the outside of the reaction tank from 6. The photochemical reaction product collects at the bottom 11 of the reaction tank and is continuously removed by means of a pipe 12 which communicates to the outside of the system. The sulfuric acid is fed from 10 and overflows from the sulfuric acid receptacle 15, which serves also as a sealing device between the outermost tube 4 of the light source and the lid portion of the reaction tank, flows down as a film over the outer wall 4, and is removed together with the photochemical reaction product from the bottom 11 of the reaction tank by means of the pipe 12. 8, 9 and 13, 14 show respectively the inlets and outlets for the cooling medium used for cooling the light source and reaction tank. And 16 is where the starting material for the reaction is fed from. When this method is used, the surface where the outer tube 4 makes contact with the reaction liquid 7 is photochemically clean at all times, making it possible to practice the photochemical reaction for a long number of hours without a decrease in the efficiency of the light.

While this invention is to be used in the production from any of the alkanes and cycloalkanes having 5 to 10 atoms their corresponding nitroso compounds or oximes, it is particularly valuable in case of the production of cycloalkanone oximes.

As those alkanes or cycloalkanes having 5–10 carbon atoms, there can be named, for example, as alkanes n-pentane, isopentane, neopentane, n-hexane, 2-methylpentane, 3 - methylpentane, 2,2 - dimethylbutane, 2,3-dimethylbutane, n-heptane, 2-methylhexane, 3-ethylpentane, 2,3-dimethylpentane, 2,4-dimethylpentane, 2,2,3-trimethylbutane, n-octane, 2-methylheptane, 3-methylheptane, 2,2-dimethylhexane, 2,3,3-trimethylpentane, n-nonane, n-decane, etc.; and as cycloalkanes, for example, cyclopentane, cyclohexane, methylcyclopentane, methylcyclohexane, ethylcyclopentane, cyclooctane, ethylcyclohexane, etc.

When, according to this invention, a cycloalkane is oximated, a mixture of a sulfuric acid salt and a halogenic acid salt of cycloalkanone oxime is obtained. Hence, it is possible to obtain readily ε-caprolactam by Beckmann's rearrangement without neutralizing the reaction product.

The separation of the oxime from this reaction product can be accomplished by dissolving the reaction product in water making it into an aqueous solution, which is thereupon neutralized with an alkaline substance.

*Example 1*

A reaction apparatus of the type as shown in the accompanying drawing was charged with 10 liters of cyclohexane. While using as the light source a 5 kw. high pressure mercury lamp, a mixed gas of nitrosyl chloride and hydrogen chloride (NOCl:HCl=1:4) was blown in continuously at the rate of 9 liters per minute at a reaction temperature of 10° C. At the same time, cyclohexane in an amount corresponding to the amount that was being consumed was fed from 16. Meanwhile, a concentrated sulfuric acid of 99.5% concentration cooled to 5° C. was allowed to flow down the wall of the outer tube 4 for 5 minutes per each 30 minute of the photochemical reaction time at the rate of about 70 cc. per minute. Even after performing the photochemical reaction for 200 hours in accordance with this invention, no decrease in the yield of the oxime per unit time was observable, and the hydrochloride salt of cyclohexanone oxime was obtained as cyclohexanone oxime at the rate of 620 grams per hour. The oxime crystals obtained by the neutralization of the photochemical reaction product exhibited a white color. If the photochemical reaction product is directly heated to 100° C. and Beckmann's rearrangement is accomplished, ε-caprolactam is obtained, the rate of conversion from cyclohexanone oxime to ε-caprolactam being 99.0%.

On the other hand, in case intermittent feeding of the sulfuric acid is not performed, there is observed a conspicuous tendency of the decrease of the oxime yield after 20 hours of reaction. After 50 hours, the decrease is such that the yield in the form of cyclohexanone oxime falls to as low as 480 grams per hour, and oxime crystals obtained by neutralization from the photochemical reaction product exhibit a light brown color and are impure.

*Example 2*

A reaction apparatus of the type as shown in the accompanying drawing was charged with 20 liters of n-heptane. While using as the light source a 10 kw. high pressure mercury lamp, a mixed gas of nitrogen oxide, chlorine and hydrogen chloride (NO:Cl$_2$:HCl=3:1:3) was fed continuously at the rate of 13 liters per minute at a reaction temperature of 15° C. At the same time, n-heptane in amounts that have been consumed by the reaction were replenished from 16. Meanwhile, a concentrated sulfuric acid of a concentration of 100% cooled to 5° C. was fed continuously from 10 at the rate of 50 cc. 1 per minute, and allowed to flow down the surface of the outer tube 4 with which the reaction liquid makes contact. As a result, even after 100 hours of reaction, the yield per unit time of the photochemical reaction product did not decrease, and when this photochemical reaction product was neutralized, dipropyl ketoxime was obtained at the rate of 1,100 grams per hour. The quality of this oxime was excellent.

Having thus described the nature of the invention, what I claim herein is:

1. In a method of continuously producing a nitroso compound and an oxime, by reacting under irradiation of an actinic light in a reaction vessel having a wall separating said light from the reaction liquid, a nitrosation agent with a compound selected from the group consisting of alkanes and cycloalkanes having 5 to 10 carbon atoms to produce its corresponding nitroso compound and oxime, the improvement consisting of passing continuously sulfuric acid having a concentration above 4% down and along the outermost surface of the reaction vessel, said outermost surface being the wall through which the light passes and where the reaction liquid makes contact.

2. A method according to claim 1 wherein the sulfuric acid used is of a concentration above 90%, particularly above 95%.

3. A method according to claim 1 wherein cyclohexanone oxime is produced using cyclohexane as the cycloalkane.

4. A method according to claim 1 wherein said irradiation is by means of a light containing therein at least some rays whose wave lengths are less than 600 m$\mu$.

5. A method of continuously producing $\epsilon$-caprolactam which comprises reacting under irradiation of a light containing therein at least some rays whose wave lengths are less than 600 m$\mu$ in a reaction vessel having a wall separating said light from the reaction liquid a nitrosation agent with cyclohexane while causing a sulfuric acid of above 90%, preferably 95% concentration, to flow continuously down along the outermost surface of the reaction vessel said outermost surface being the wall through which the light passes and where the reaction liquid makes contact, and thereafter heating the sulfuric acid solution separated from the reaction liquid in order to bring about Beckmann's rearrangement.

References Cited in the file of this patent
UNITED STATES PATENTS
2,818,380    Welz _____ Dec. 31, 1957